(12) United States Patent
Koseki et al.

(10) Patent No.: US 9,415,727 B2
(45) Date of Patent: Aug. 16, 2016

(54) ON-VEHICLE APPARATUS

(75) Inventors: Tomohisa Koseki, Kobe (JP); Masashi Hida, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 1016 days.

(21) Appl. No.: 13/603,909

(22) Filed: Sep. 5, 2012

(65) Prior Publication Data

US 2013/0147847 A1    Jun. 13, 2013

(30) Foreign Application Priority Data

Dec. 12, 2011  (JP) ................................. 2011-270858

(51) Int. Cl.
*G09G 5/00*  (2006.01)
*B60R 11/02*  (2006.01)
*B60R 11/00*  (2006.01)

(52) U.S. Cl.
CPC ..... *B60R 11/0235* (2013.01); *B60R 2011/0005* (2013.01); *B60R 2011/0084* (2013.01); *B60R 2011/0085* (2013.01); *B60R 2011/0092* (2013.01)

(58) Field of Classification Search
CPC ............... B60R 11/0235; B60R 2011/0005; B60R 2011/0084; B60R 2011/0085; B60R 2011/0092
USPC ...................................................... 296/37.12
See application file for complete search history.

(56) References Cited

U.S. PATENT DOCUMENTS

| | | | |
|---|---|---|---|
| 5,970,042 A * | 10/1999 | Fujimoto | G11B 17/021 369/30.78 |
| 6,233,139 B1 | 5/2001 | Hamon | |
| 6,499,788 B2 * | 12/2002 | Ito | B60K 35/00 296/37.12 |
| 8,910,990 B1 * | 12/2014 | Oldani | B60R 11/02 220/260 |
| 2007/0046850 A1 | 3/2007 | Wang | |
| 2008/0065291 A1 * | 3/2008 | Breed | B60N 2/002 701/36 |
| 2011/0166782 A1 * | 7/2011 | Watanabe | B60R 1/00 701/532 |
| 2012/0068956 A1 * | 3/2012 | Jira | B60K 37/06 345/174 |

FOREIGN PATENT DOCUMENTS

| | | |
|---|---|---|
| CN | 102149573 A | 8/2011 |
| JP | U-64-8618 | 1/1989 |
| JP | A-2008-301122 | 12/2008 |
| JP | 2009-216888 A | 9/2009 |
| JP | A-2010-122909 | 6/2010 |
| JP | A-2010-143401 | 7/2010 |

OTHER PUBLICATIONS

Sep. 29, 2015 Office Action issued in Japanese Application No. 2011-270858.
Nov. 2, 2014 Office Action issued in Chinese Application No. 201210276079.1.

* cited by examiner

*Primary Examiner* — Pinel Romain
(74) *Attorney, Agent, or Firm* — Oliff PLC

(57) ABSTRACT

On an on-vehicle apparatus that is installed on a vehicle, a display that has a long side and a short side and displays an image is rotated so that a vertical position of an upper side of the display in a first position where the long side becomes the upper side substantially coincides with the vertical position of the upper side of the display in a second position where the short side becomes the upper side. This allows the display to be set at an easily visible position for a user with less eye movement.

13 Claims, 13 Drawing Sheets

ON-VEHICLE APPARATUS

BACKGROUND OF THE INVENTION

1. Field of the Invention

The invention relates to a technology for rotating a display for use in a vehicle.

2. Description of the Background Art

Conventionally, a display that includes a touch panel or the like is installed in a vehicle to display map images or others for a navigation apparatus installed in the vehicle. On this display, a user (mainly a driver) can know his/her current position by referring to the display map and make operations on the touch panel to enter his/her destination. Since the display is normally in a sideways rectangle, an image in any type of its contents for display needs to be processed to meet such a shape. For example, Japanese Patent Application Laid-open Publication No. 2010-143401 discloses a technology that sets a display by rotating the display to a position appropriate to an image for display, in a vertically-long position or a horizontally-long position.

However, since the technology disclosed by Japanese Patent Application Laid-open Publication No. 2010-143401 rotates the display around a fixed rotation shaft, the position of the outer frame of the display, especially the vertical position of the upper side of the outer frame, varies before and after the rotation. Therefore, when the user views the displayed image after the rotation on the rotated display in a vehicle likewise, the user has to move his/her eyes a distance before and after the rotation; the displayed image is not easily visible for the user. This has been the issue to be solved. Moreover, in some cases, when the display in the horizontally-long position is rotated to the vertically-long position, the display may block the air outlet of an air conditioner or driver's eyesight.

SUMMARY OF THE INVENTION

According to one aspect of the invention, an on-vehicle apparatus that is installed on a vehicle includes a display that has a long side and a short side and displays an image, and a rotation mechanism that rotates the display between a first position where the long side becomes an upper side and a second position where the short side becomes the upper side. The rotation mechanism rotates the display so that a vertical position of the upper side of the display in the first position substantially coincides with the vertical position of the upper side of the display in the second position. Since the display is rotated so that the vertical position of the upper side of the display in the first position where the long side becomes the upper side substantially coincides with the vertical position of the upper side of the display in the second position where the short side becomes the upper side, the on-vehicle apparatus is capable of setting the display by rotating the display to an easily visible position for a user.

According to another aspect of the invention, the rotation mechanism rotates the display so that the vertical position of the upper side of the display in the first position substantially coincides with vertical position of the upper side of the display in the second position. The display includes a center shaft disposed substantially at a middle of both of the long side and the short side of the display. The center shaft works as a center of rotation performed by the rotation mechanism. The rotation mechanism slides the center shaft in a vertical direction. Since the center shaft working as the center of rotation performed by the rotation mechanism is set substantially at the middle of both of the long side and the short side of the display, the on-vehicle apparatus is capable of easily causing a horizontal center of the display in the first and second positions to have a same position in a horizontal direction.

Therefore, the object of the invention is to provide the technology to set a display by rotating the display to an easily visible position for a user.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to attached drawings.

<1. First Embodiment>
<1-1. Outline>

Figure 1:
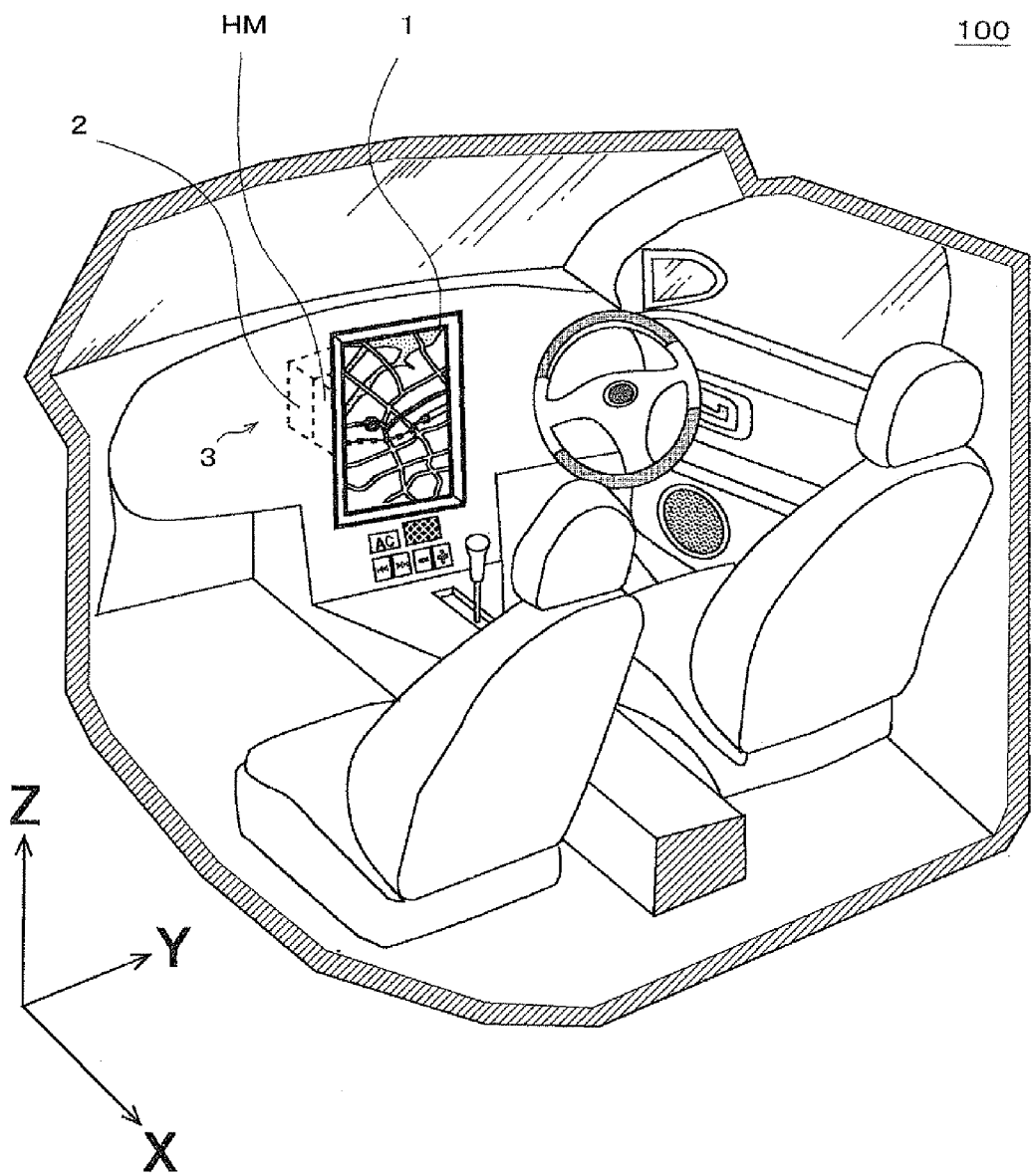
FIG. 1 shows a perspective view of a vehicle cabin having an on-vehicle apparatus.

FIG. 1 shows a perspective view of an inside of a vehicle cabin 100 of a vehicle having an on-vehicle apparatus 3.

On the on-vehicle apparatus 3 having a display 1 set in a center console or its periphery of the vehicle cabin 100, a user can view the display 1 in a vehicle to obtain the information he/she wants. When the display 1 includes a touch panel or the like, the user can enter information into the on-vehicle apparatus 3 by making operations on the touch panel. Here is an example of displaying a road map on the display 1 for a navigation function providing route guide. The user can enter his/her destination by making operations on the display 1, and view the route to the destination. Here is another example of the display 1 displaying some buttons for operating vehicle devices through the touch panel. The user can control temperature or volume of air from an air conditioner on the touch panel.

A main body 2 of the on-vehicle apparatus 3 is fixed to the vehicle. The display 1 is disposed rotatably to the main body 2 of the on-vehicle apparatus 3. That is, the rectangle-shaped display 1 that is disposed in a vertically-long position as shown in FIG. 1 can be rotated to a horizontally-long position (refer to FIG. 3). As above, the display 1 is rotatable depending on the information to be displayed, which enables efficient use of the display area of the display 1. The mechanism for rotating the display 1 is detailed later.

Hereinafter, directions and aspects are appropriately indicated by use of XYZ Cartesian coordinate system in three dimensions indicated in figures. An X-axis direction is defined as a front-back direction of the vehicle, a Y-axis direction as a right-left direction, and a Z-axis as a vertical direction. Moreover, the side of +X (+X direction) is defined as the side of the user's seat (user side) seen from the center console, that is, the rear side of the vehicle. The side of +Z (+Z direction) is defined as the upper side in a vertical direction, and the side of +Y (+Y direction) is defined as the right side of the vehicle. Thus, the side of −X (−X direction) corresponds to the forward side of the vehicle, the side of −Z (−Z direction) to the lower in the vertical direction, and the side of −Y (−Y direction) to the left of the vehicle.

The display 1 has a touch panel that includes a liquid crystal screen for image display and a touch sensor (a capacitive touch panel device or a resistive touch panel device that transmits the signal corresponding to the coordinates of the touched location). The screen of the display 1 is to be touched for operation by the user. The screen displays maps for navigation guide, voice (music) data for an audio function, button images for a touch panel function, etc. The display 1 may include mechanical switches.

The on-vehicle apparatus 3 includes a holding member HM for holding the display 1, and the display 1 held by the holding member HM. The on-vehicle apparatus 3 is set in the center console or a peripheral panel of the vehicle cabin. It is recommended to set the on-vehicle apparatus 3 in such a manner that the installation surface of the display 1 is slightly tilted upward (+Z direction). Such installation makes it easier to face upward the operation surface of the installed display 1, that is, to set the operation surface at a face-to-face angle with the user. In most vehicles, the center console is tilted so that the lower part of the center console is expanded toward the rear of the vehicle due to a design matter or for the purpose of better operability on the operation parts of an air conditioner or the like. To install the on-vehicle apparatus into the opening of the center console having no extra clearance, the on-vehicle apparatus is normally fixed perpendicular to the console surface. As a result, the surface of the on-vehicle display is normally tilted slightly upward toward the rear of the vehicle. However, in the description of the embodiment, the surface of the display faces directly the rear of the vehicle.

The holding member HM is a so-called bracket that fixes the display 1 to the main body 2. The holding member HM may be configured to fix the display 1 to the main body 2 in a removable manner.

Hereinafter, described are the configuration and the processing flows of the on-vehicle apparatus 3 set in the vehicle cabin 100.

<1-2. Configuration>

Figure 2:
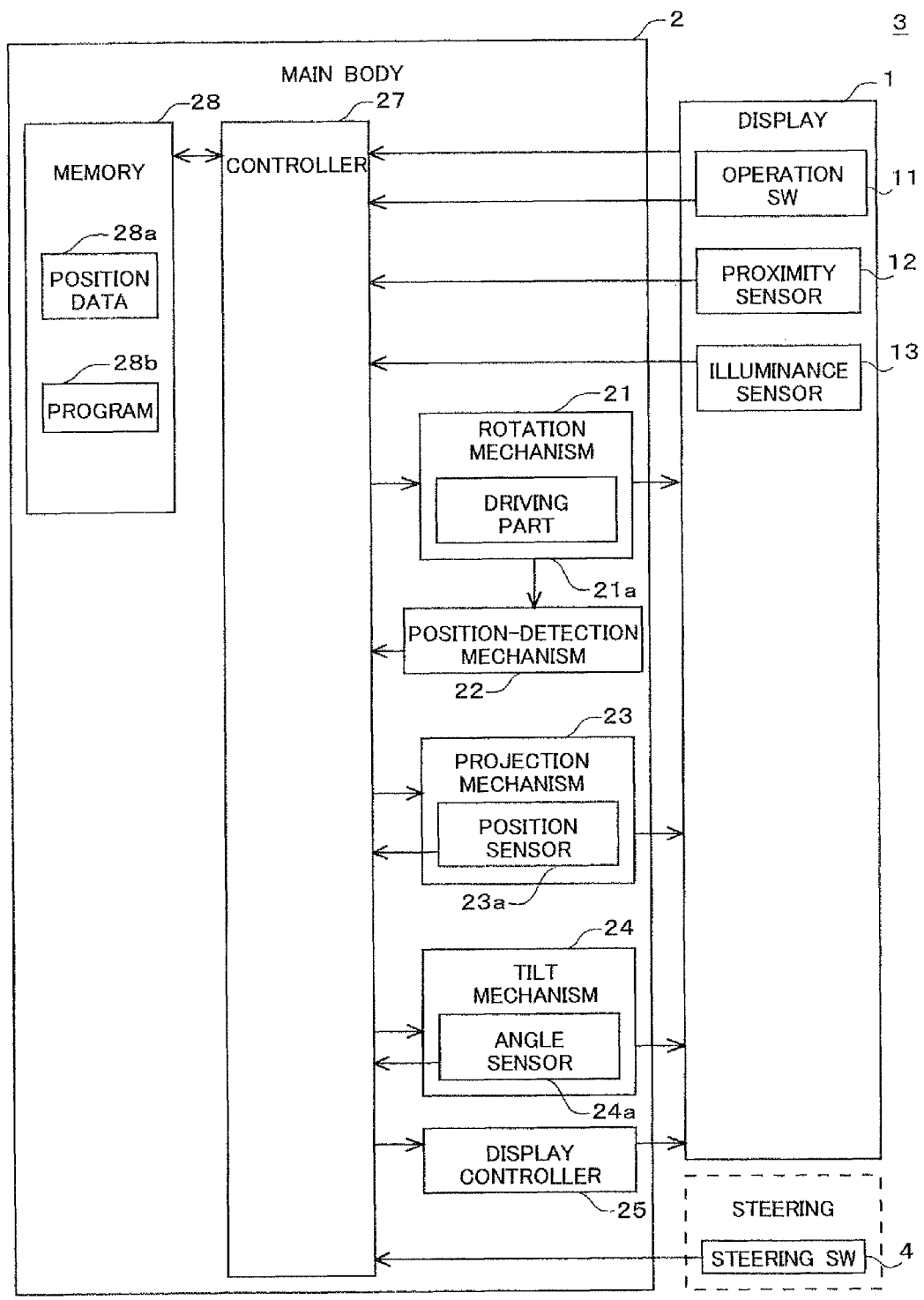
FIG. 2 shows a block diagram of the on-vehicle apparatus of the first embodiment.

The configuration of the on-vehicle apparatus 3 is described. FIG. 2 shows a block diagram of the configuration of the on-vehicle apparatus 3 including the display 1.

The display 1 includes an operation SW 11, a proximity sensor 12 and an illuminance sensor 13 besides the liquid crystal screen described above (not shown in FIG. 2). The shape of the display 1 is a rectangle having a long side and a short side. The display 1 preferably has a touch panel; however, it is not limited to the touch panel. Another item is acceptable as long as the item can receive operation data by a user.

The operation SW 11 is a mechanical switch. On or off data are transmitted to the main body when a user pushes the operation SW 11. The operation SW 11 may be a potentiometer of which a user operates a slider.

The proximity sensor 12 is an infrared sensor that detects an object approaching the display. Upon detecting the object approaching the display, the proximity sensor 12 transmits a predetermined detection signal to the main body 2. The proximity sensor 12 is installed on the outer frame of the screen of the display 1. Concretely, the proximity sensor 12 is installed at each of the four corners of the outer frame. Upon putting a hand close to the proximity sensor 12 by the user, the main body 2 receives the detection signal. Based on the detection signal transmitted from the proximity sensor 12, the main body 2 can start rotating the position of the display 1. That is, a user can start rotating the position of the display 1 simply by putting his/her hand close to the outer frame of the screen of the display 1. Therefore, the sensitivity of the proximity sensor 12 is adjusted so as to detect only the object that has approached to a few centimeters. The proximity sensor 12 may be installed at the center of each of the upper sides of the outer frame. Upon receiving the signal transmitted from the proximity sensor 12 configured as above, the display 1 may be tilted or projected into the vehicle cabin. The proximity sensor 12 is not limited to the infrared sensor. Another type of sensor, such as a radio frequency sensor or an acoustic wave sensor, may be used, as long as the sensor can detect an object approaching the display.

The illuminance sensor 13 detects the illuminance of the inside of the vehicle cabin 100, and transmits the detected illuminance data to a controller 27. Based on the illuminance data transmitted from the illuminance sensor 13, the controller 27 can estimate the intensity of the light emitted to the screen (operation surface) of the display 1. The reflection of the strong light emitted to the screen of the display 1 makes it difficult for a driver to recognize the images displayed on the screen. Therefore, when the controller 27 estimates that the screen is exposed to the light having the intensity enough to make it difficult for the driver to recognize the images displayed on the screen, the controller 27 controls the reflection by changing a tilt angle (to change a reflex direction), or controls color tone so that the driver can easily recognize the images.

The main body 2 equipped with the display 1 is a box enclosure for installation in the vehicle cabin 100. The dimensions of the main body 2 conform to a so-called Double DIN standard that is applied as the standard for on-vehicle devices: approx. 190 mm (X-axis direction)×170 mm (Y-axis direction)×94 mm (Z-axis direction). The main body 2 includes a rotation mechanism 21, a position-detection mechanism 22, a projection mechanism 23, a tilt mechanism 24, a display controller 25, the controller 27 and a memory 28.

The rotation mechanism 21 is a mechanism that rotates the display 1 from a vertically-long position to a horizontally-long position or from the horizontally-long position to the vertically-long position. Moreover, the rotation mechanism 21 sets the upper-side location of the display 1 after the rotation substantially at the same level as the location before the rotation. In the case of the display 1 that is removable to the on-vehicle apparatus 3, the rotation mechanism 21 is configured as a part of the holding member HM. The rotation mechanism 21 includes a driving part 21a. The action by the rotation mechanism 21 to rotate the position of the display 1 is detailed later.

Figure 3:
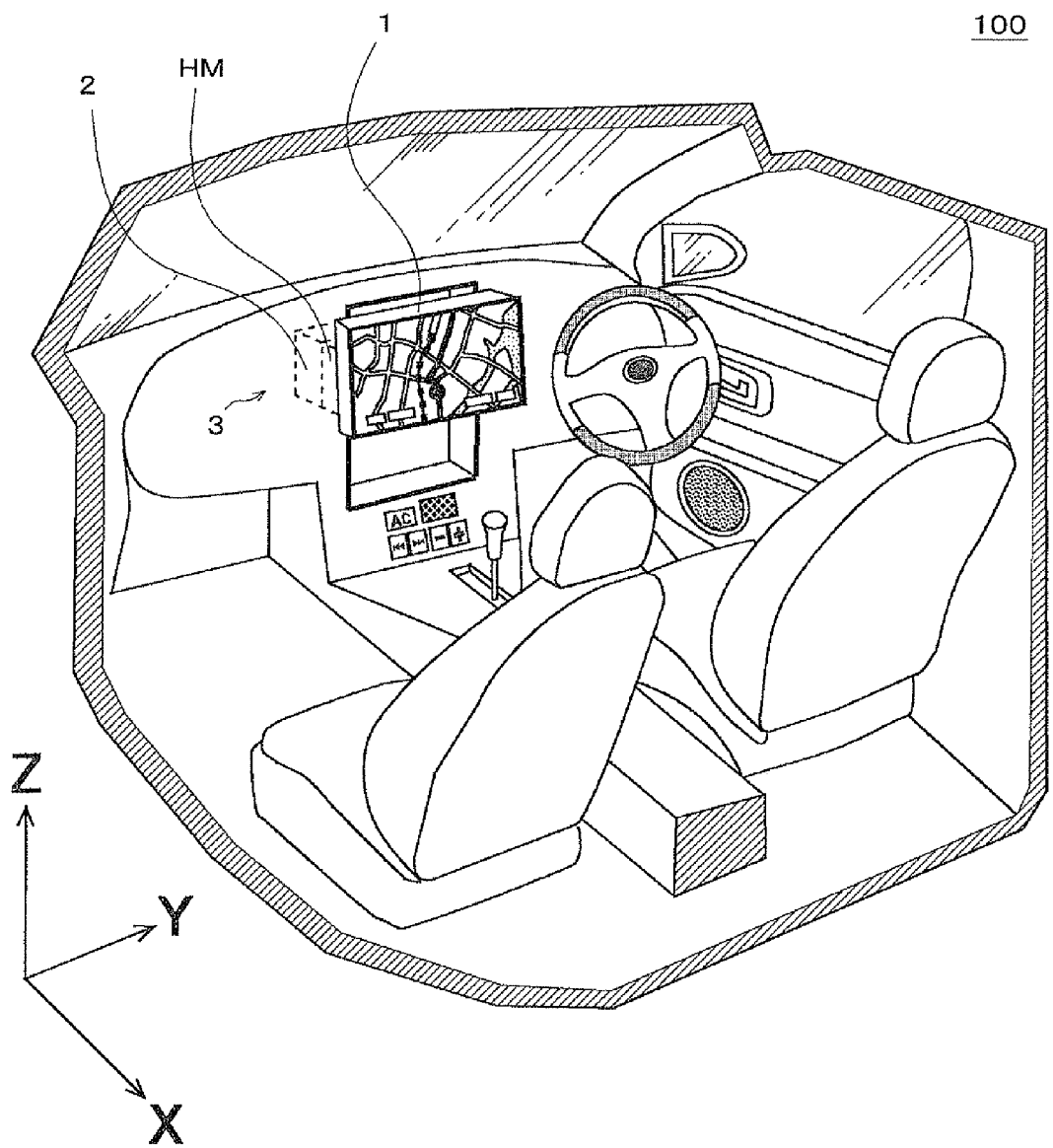
FIG. 3 shows another perspective view of the vehicle cabin having the on-vehicle apparatus.

Here, the vertically-long position of the display 1 is the position where the long side of the rectangle-shaped display 1 is set vertically, that is, the short side is an upper side, as shown in FIG. 1. The horizontally-long position of the display 1 is the position where the long side of the rectangle-shaped display 1 is set horizontally, that is, the long side is an upper side, as shown in FIG. 3 described later.

The driving part 21a provides power to the rotation mechanism 21 to rotate the display 1, and includes an electric motor and gears. The driving part 21a is controlled by the controller 27 in terms of the rotation direction, rotation speed and torque of the electric motor.

The position-detection mechanism 22 is a switch mechanism that detects the position of the display 1, a vertically-long position or a horizontally-long position. The position-detection mechanism 22 transmits to the controller 27 described later a predetermined signal depending on the position of the display 1, the vertically-long position or the horizontally-long position, based on the action by the rotation mechanism 21.

The projection mechanism 23 projects the display 1 to the user's seat side (a user side) seen from the center console, that is, a rear side (+X direction) of the vehicle. The projection mechanism 23 includes an electric motor, gears and a rack gear lever. The projection mechanism 23 further includes a position sensor 23a. The action by the projection mechanism 23 to project the display 1 to the rear side (+X direction) of the vehicle is described later.

The position sensor 23a detects the relative position to the main body 2, of the display 1 projected by the projection mechanism 23, and transmits the detected position data to the controller 27. The position sensor 23a may be formed by a variable resistor, an optical sensor that optically detects the slits arrayed at predetermined intervals, or a motor that controls rotation speed or rotation period of the gears to move the display 1.

The tilt mechanism 24 tilts the screen of the display 1 by changing its tilt angle. That is, the tilt mechanism 24 causes the screen of the display 1 to tilt vertically (Z-axis direction) around a shaft along the Y-axis direction. The tilt mechanism 24 includes an angle sensor 24a. The action by the tilt mechanism 24 to change the tilt angle of the display 1 is detailed later.

The angle sensor 24a detects the tilt angle of the display 1, and transmits to the controller 27 the angle data indicating the tilt angle. The angle data are the values to be converted to degrees ([deg] or [°]) or radians [rad], indicating the inclination of the display 1. Here is an example; when the operation surface of the display 1 is set along a vertical line (Z-axis direction), the tilt angle is 0°. As the operation surface is tilting so that the surface is facing upper side (+Z direction), the tilt angle is increasing. The angle sensor 24a may be fowled by a variable resistor.

The display controller 25 displays a predetermined image on the screen of the display 1. The image includes a map image, an icon for use on the touch panel, etc. The display controller 25 divides the display area of the screen of the display 1, and displays an applicable image on each divided area. Moreover, when the screen of the display 1 is rotated, that is, the display 1 is rotated from the vertically-long position to the horizontally-long position, or from the horizontally-long position to the vertically-long position, the display controller 25 displays the image corresponding to the changed position of the display 1.

The controller 27 is a micro computer that comprehensively controls the mechanisms, sensors and other devices included in the on-vehicle apparatus 3. The controller 27 includes a CPU, RAM and ROM. The CPU carries out a predetermined operation based on a program 28b stored in the memory 28 to control the mechanisms, the sensors and other devices.

The memory 28 that is a nonvolatile memory storing electronic data includes flash memory or EEPROM. The controller 27 writes data in and reads out the stored data from the memory 28 that is connected to the controller 27. The memory 28 stores position data 28a and the program 28b. The memory 28 may be formed by a portable memory such as a memory card that is removable from the on-vehicle apparatus 3.

The position data 28a that specify the position of the display 1 include the projection. position (position in the X-axis direction) and the tilt angle of the display 1. The position data 28a may include data specifying a plurality of positions and angles. The plurality of positions and angles are set individually for a plurality of users, and are selected in accordance with the user (driver) got inside the vehicle. The position data 28a are entered by the user via the touch panel or the operation SW 11 included in the display 1, and stored in the memory 28.

The program 28b is so-called system software that the controller 27 reads out and executes to control each of the mechanisms of the on-vehicle apparatus 3.

A steering SW 4 is a switch mechanism set on the steering of the vehicle. The user can enter predetermined data into the controller 27 of the main body 2 by operating the steering SW 4.

<1-3. Example of Rotation of Display 1>

Next, the position of the display 1 is described based on figures.

FIG. 3 shows a perspective view of the inside of the vehicle cabin 100, having the display 1 in the horizontally-long position. The display 1 shown in FIG. 3 is in the position rotated approx. 90° around a shaft along the X-axis from the vertically-long position, that is, the position almost perpendicular to the position shown in FIG. 1. The display 1 in the horizontally-long position is rotated from the vertically-long position by the rotation mechanism 21. Moreover, the rotation mechanism 21 sets the upper-side location of the display 1 after the rotation so as to substantially coincide with that before the rotation. That is, the upper side of the display 1 in the vertically-long position shown in FIG. 1 and the upper side of the display 1 in the horizontally-long position shown in FIG. 3 are located substantially at the same vertical level. Further, the rotation mechanism 21 sets the horizontal center of the display 1 after the rotation substantially on the same vertical line as the horizontal center before the rotation. This reduces movement of user's. eyes of viewing images displayed on the display 1 before and after the rotation. The on-vehicle apparatus 3 is capable of setting the display 1 by rotating it to an easily visible position for the user.

<1-4. Rotation Mechanism>

Next, described is the action to rotate the display 1 between the vertically-long position and the horizontally-long position.

Figure 4:
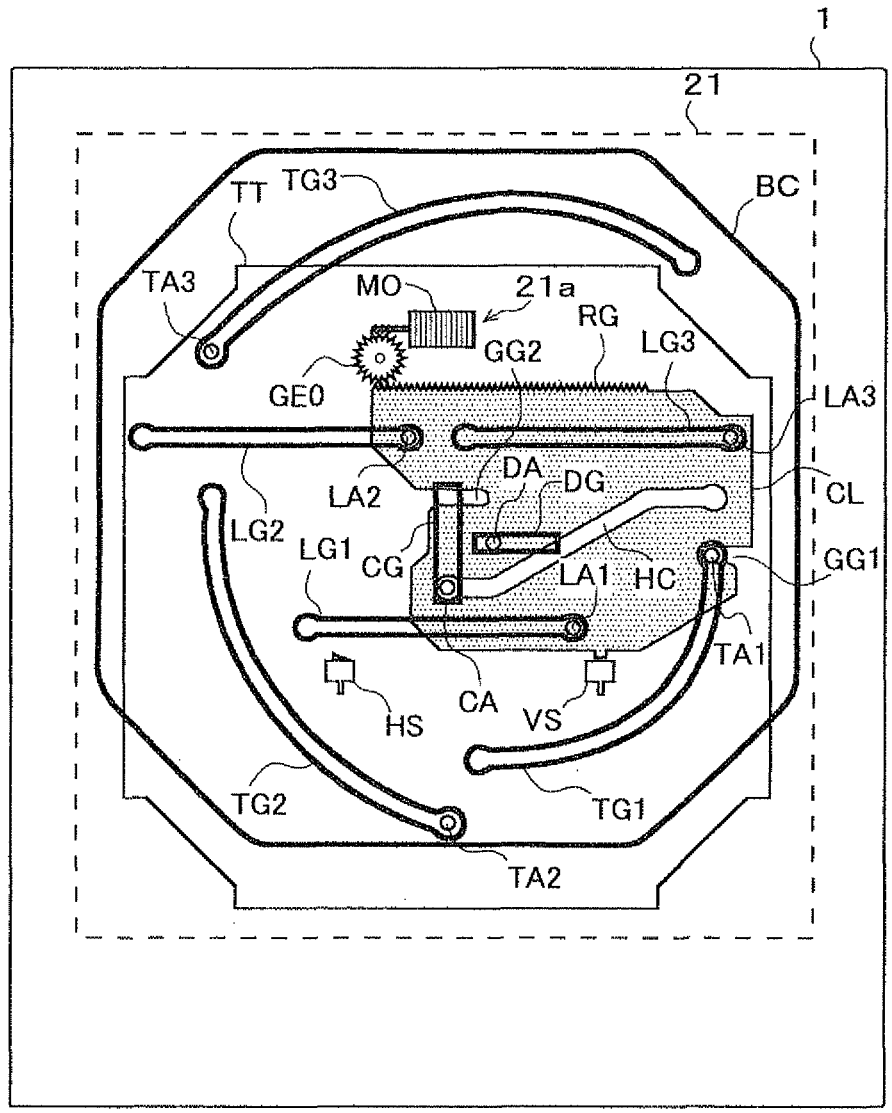
FIG. 4 shows a rear view of a display and a rotation mechanism set in a vertically-long position.
Figure 4:
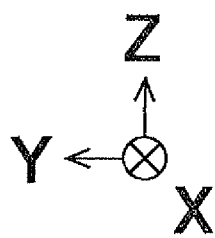
Figure 6:
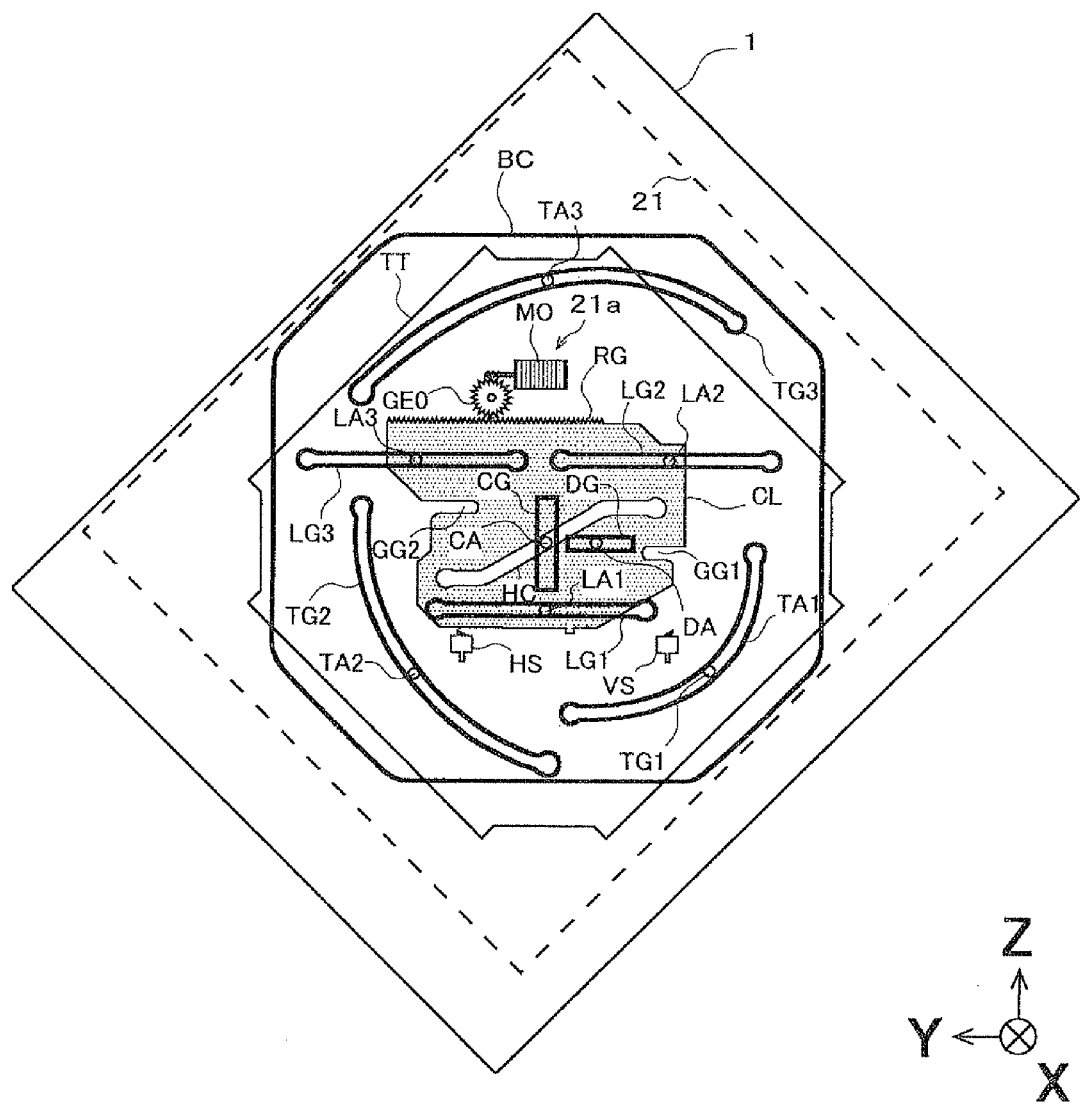
FIG. 6 shows another rear view of the display and the rotation mechanism in the middle of rotating.
Figure 7:
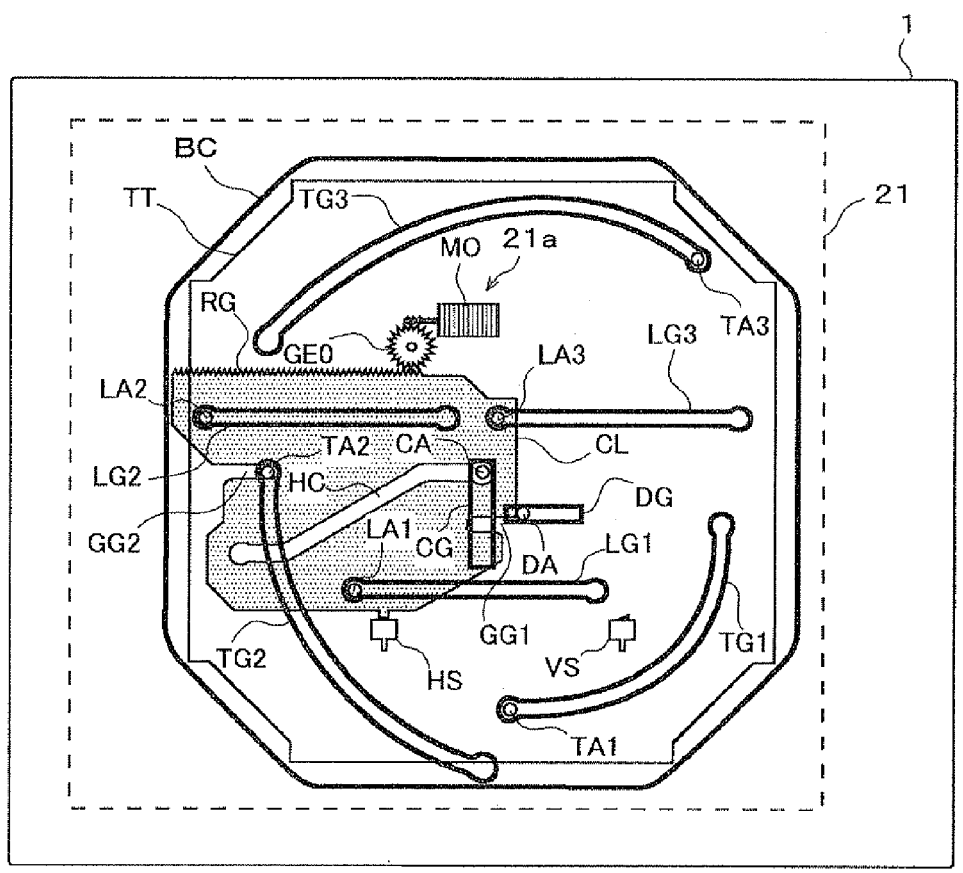
FIG. 7 shows another rear view of the display and the rotation mechanism set in the horizontally-long position.

Each of FIG. 4, FIG. 6 and FIG. 7 shows a rear view of the display 1 and the rotation mechanism 21 seen from the forward side of the vehicle (−X direction). The set of the figures shows the rotating action of the display 1 in series from the vertically-long position to the horizontally-long position. For convenience sake, components are shown in overlapped forms in figures. Therefore, the component located in +X direction (rear side of the vehicle) farther than other components may be shown with being overlapped by the other ones in figures.

FIG. 4 shows the rear view of the rotation mechanism 21 and the display 1 set in the vertically-long position, seen from the forward side of the vehicle (−X direction).

The rotation mechanism 21 is disposed at the back side of the display 1. The rotation mechanism 21 is held by the holding member HM and connected to the main body 2. The rotation mechanism 21 includes a base chassis BC, a turntable TT, a cam lever CL and the driving part 21a, and functions to rotate the display 1 from the vertically-long position to the horizontally-long position, and from the horizontally-long position to the vertically-long position.

The base chassis BC is a platy member to be fixed to the holding member HM. The base chassis BC is fixed to the holding member HM so that the rotation mechanism 21 is set to the holding member HM. That is, the base chassis BC is fixed to the vehicle. It is desirable that the base chassis BC is made of metal materials. That is because the base chassis BC needs a certain level of rigidity for supporting the display 1 that has a certain weight. In figures, for the purpose of showing clear positional relations between the members, the base chassis BC is indicated with a bolder line than the other lines. The base chassis BC has various slit openings; a center-shaft guide groove CG, a complementary-shaft guide groove DG, a rotation guide groove (vertical) TG1, a rotation guide groove (horizontal) TG2, a rotation guide groove TG3, a cam lever guide groove LG1, a cam lever guide groove LG2 and a cam lever guide groove LG3. Each of the guide grooves is fitted by a corresponding shaft and guides the shaft along the shape of the groove.

The center-shaft guide groove CG is formed vertically (Z-axis direction) at almost the center part on the base chassis BC. The center-shaft guide groove CG is fitted by a rotation center shaft CA that is set on the turntable TT as the center of the rotation of the display 1, and guides the rotation center shaft CA sliding.

The complementary-shaft guide groove DG is formed in a horizontally-extended shape (Y-axis direction) substantially perpendicular to the center-shaft guide groove CG at the periphery of the vertically-center position of the center-shaft guide groove CG. The complementary-shaft guide groove DG guides a complementary shaft DA that is set a predetermined distance away from the rotation center shaft CA on the turntable TT.

Each of the rotation guide groove (vertical) TG1, the rotation guide groove (horizontal) TG2 and the rotation guide groove TG3 is formed substantially in a shape of arc to fit rotation of the specific part of the display 1. The guide grooves respectively guide three rotation lock shafts; a rotation lock shaft TA1, a rotation lock shaft TA2 and a rotation lock shaft TA3, which are set on the turntable TT to support the display 1.

The cam lever guide grooves LG1, LG2 and LG3 are respectively formed along the horizontal direction (Y-axis direction). The cam lever guide grooves LG1, LG2 and LG3 respectively guide a guide shaft LA1, a guide shaft LA2 and a guide shaft LA3 that are set on the cam lever CL. This structure specifies the movement of the cam lever CL only in the horizontal direction (Y-axis direction).

The base chassis BC includes the position-detection mechanism 22. The position-detection mechanism 22 includes a vertical-position-detection switch VS and a horizontal-position-detection switch HS. Each of the switches includes a push-switch mechanism and detects the display 1 rotating to the vertically-long position or to the horizontally-long position. Moreover, when the projection set at an edge of the cam lever CL makes contact with each of the switches, the switch is pushed. Therefore, the vertical-position-detection switch VS is set at the location corresponding to the projection part of the cam lever CL at the time when the display 1 is in the vertically-long position. As well, the horizontal-position-detection switch HS is set at the location corresponding to the projection part of the cam lever CL at the time when the display 1 is in the horizontally-long position. Each of the switches may include an optical sensor or a sliding variable resistor, not only the push-switch mechanism.

The turntable TT is a platy member to be fixed to the display 1 and transmits rotation power of the rotation mechanism 21 to the display 1. The turntable TT is fixed to the display 1 so that the rotation mechanism 21 is set to the display 1. It is desirable that the turntable TT is made of metal materials. That is because the turntable TT needs a certain level of rigidity for supporting the display 1 that has a certain weight. The turntable TT has various shafts; the rotation center shaft CA, the complementary shaft DA, the rotation lock shaft (vertical) TA1, the rotation lock shaft (horizontal) TA2 and the rotation lock shaft TA3, which respectively fit in the guide grooves described above.

The rotation center shaft CA is the center of the display 1 at the time of rotating by the rotation mechanism 21. The rotation center shaft CA is set substantially at the center of the long side and as well of the short side of the display 1, that is, the crossing point of two diagonal lines of the display 1, and fits in the center-shaft guide groove CG. The rotation center shaft CA also fits in a center-shaft up-down cam HC that is formed on the cam lever CL. In accordance with the movement of the cam lever CL, the rotation center shaft CA is guided along the slope part of the center-shaft up-down cam HC, and is also slid vertically (Z-axis direction) along the center-shaft guide groove CG as a shift shaft.

The complementary shaft DA assists the display 1 at the time of rotating by the rotation mechanism 21. The complementary shaft DA is also deemed as the second shaft that is the center of the display 1 at the time of rotating. The complementary shaft DA fits in the complementary-shaft guide groove DG, and slides along the complementary-shaft guide groove DG as a shift shaft. The location of the complementary shaft DA is set a predetermined distance away from the location of the rotation center shaft CA. Even when both of the complementary shaft DA and the rotation center shaft CA slide respectively along the predetermined guides, the relative distance between them is kept constant.

The rotation lock shaft (vertical) TA1, the rotation lock shaft (horizontal) TA2 and the rotation lock shaft TA3 fit respectively in the rotation guide groove (vertical) TG1, the rotation guide groove (horizontal) TG2 and the rotation guide groove TG3, which are formed on the base chassis BC. The rotation lock shafts TA1, TA2 and TA3 are fixed to the display 1 via the turntable TT, and respectively slide along the rotation guide grooves TG1, TG2 and TG3 to support the rotation of the display 1.

The cam lever CL is a platy member to be set in a horizontally (Y-axis direction) movable condition on the base chassis BC. In figures, for the purpose of showing clear positional relations between the members, the cam lever CL is hatched. The cam lever CL has various portions; a rack gear lever RG, the center-shaft up-down cam HC, a lock groove (vertical) GG1 and a lock groove (horizontal) GG2, and includes the guide shaft LAl, the guide shaft LA2 and the guide shaft LA3.

The rack gear lever RG is formed at the upper edge (edge of +Z direction) of the cam lever CL, and meshes with a gear GE0 described later, of the driving part 21a. The power transmitted from the driving part 21a via the rack gear lever RG moves the cam lever CL horizontally (Y-axis direction). The rack gear lever RG may be formed at the lower edge (edge of −Z direction).

The center-shaft up-down cam HC is a slit cam formed on the cam lever CL. The center-shaft up-down cam HC includes two edges that vary in height and a slope part that connects the two edges. The edge of +Y direction (left side in the figures) of the center-shaft up-down cam HC is located lower than the edge of −Y direction (right side in the figures). The two edges of the center-shaft up-down cam HC are formed in horizontally-long shapes. The rotation center shaft CA fits in the center-shaft up-down cam HC. Thus, the horizontal (Y-axis direction) movement of the center-shaft up-down cam HC shifts the fitting rotation center shaft CA vertically (Z-axis direction) due to the slope part.

The lock groove (vertical) GG1 is a cutout formed at the edge of −Y direction (right side in the figures) of the cam lever CL, and the lock groove (horizontal) GG2 is a cutout formed at the edge of +Y direction (left side in the figures). The lock groove (vertical) GG1 formed at the edge of −Y direction (right side in the figures) is configured so as to be fitted in by the rotation lock shaft (vertical) TA1 when the cam lever CL moves to the position where the display 1 is in the vertically-long position (right side in the figures). The rotation lock shaft (vertical) TA1 is fixed to the turntable TT that is fixed to the display 1. Thus, the display 1 is fixed to the cam lever CL in the vertically-long position due to the fitting of the rotation lock shaft (vertical) TA1 in the lock groove (vertical) GG1. Moreover, the rotation lock shaft (vertical) TA1 is fixed at the upper edge of the rotation guide groove (vertical) TG1 of the base chassis BC. Therefore, the display 1 is fixed to the base chassis BC and kept in the vertically-long position. This prevents a backlash of the display 1 in the vertically-long position.

The lock groove (horizontal) GG2 formed at the edge of +Y direction is configured so as to be fitted in by the rotation lock shaft (horizontal) TA2 when the cam lever CL moves to the position where the display 1 is in the horizontally-long position (left side in the figures) (refer to FIG. 7). This causes the lock groove (horizontal) GG2 to function in the same manner as the lock groove (vertical) GG1, which prevents a backlash of the display 1 in the vertically-long position.

The guide shaft LA1, the guide shaft LA2 and the guide shaft LA3 respectively fit in the cam lever guide groove LG1, the cam lever guide groove LG2 and the cam lever guide groove LG3 that are fowled on the base chassis BC. The guide shafts LA1, LA2 and LA3 respectively slide along the cam lever guide grooves LG1, LG2 and LG3 that are formed in the horizontally direction (Y-axis direction) in accordance with the movement of the cam lever CL, and support the cam lever CL to move.

The driving part 21a provides power to the rotation mechanism 21 to rotate the display 1. The driving part 21a includes a driving motor MO and the gear GE0.

The driving motor MO is an electric motor that includes a motor shaft set along the horizontal direction (Y-axis direction), and is connected to a power supply not shown in the figures. A worm gear that meshes with the gear GE0 is fixed to the motor shaft. The driving motor MO is controlled by the controller 27 in terms of its rotation direction, rotation speed and torque.

The gear GE0 meshes with the worm gear of the driving motor MO and the rack gear lever RG of the cam lever CL, and transmits to the cam lever CL the power from the driving motor MO.

Figure 5:
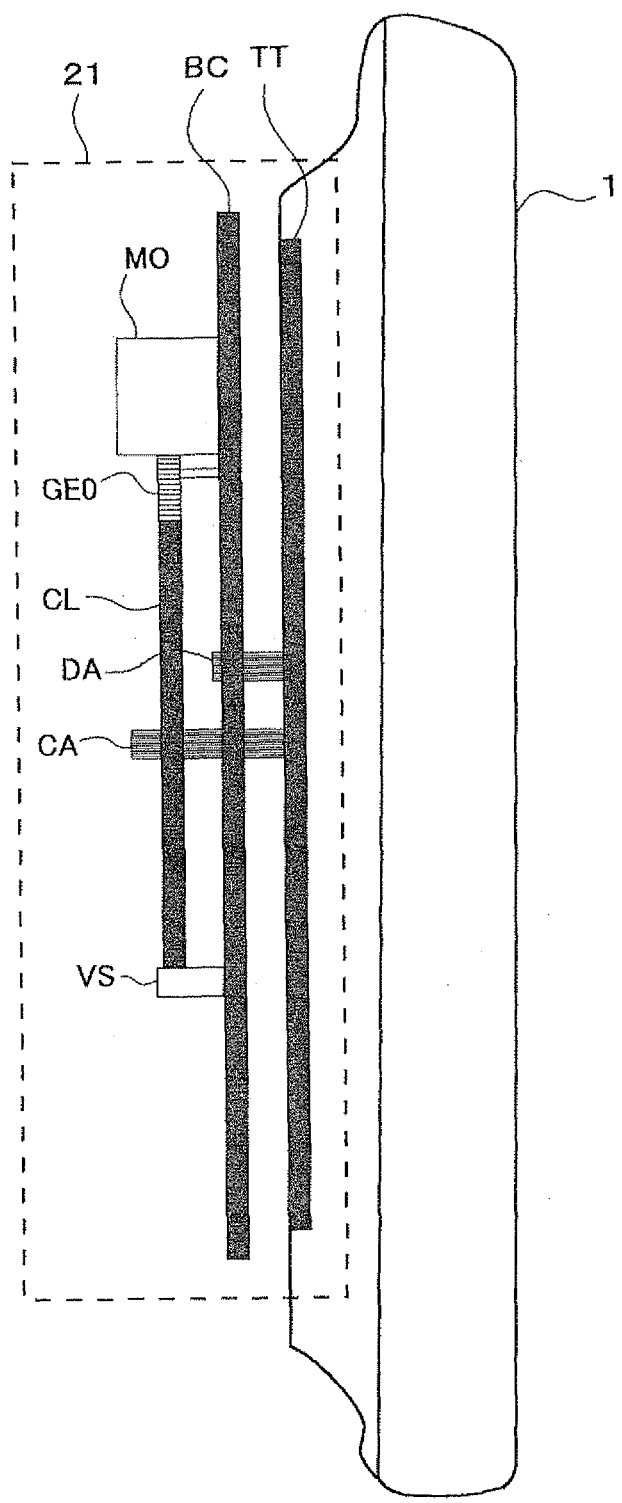
FIG. 5 shows a side view of the display and the rotation mechanism set in the vertically-long position.

Next, arrangement of the components of the display 1 and the rotation mechanism 21 is described based on their side view. FIG. 5 shows the side view seen from −Y direction, of the rotation mechanism 21 and the display 1 disposed in the vertically-long position, which shows only the excerpted components required for description.

In FIG. 5, the turntable TT is fixed to the display 1. The base chassis BC is set in front of the turntable TT in the forward direction of the vehicle (−X direction). Further, the cam lever CL is set in front of the base chassis BC in forward direction (−X direction).

The rotation center shaft CA that is fixed on the turntable TT fits in the center-shaft guide groove CG that is formed on the base chassis BC and the center-shaft up-down cam HC that is formed on the cam lever CL.

The cam lever CL makes a contact at the upper edge (edge of +Z direction) with the gear GE0 that is rotated by the driving motor MO, and also makes a contact at the lower edge (edge of −Z direction) with the vertical-position-detection switch VS.

As above, on the rotation mechanism 21, the components including the turntable TT, the base chassis BC and the cam lever CL are disposed in layers in the X-axis direction.

Next, described is the action of the rotation mechanism 21 to rotate the display 1 from the vertically-long position shown in FIG. 4 to the horizontally-long position shown in FIG. 7. Upon putting a hand close to the proximity sensor 12 by a user or at other occasions, the controller 27 drives the driving motor MO to start the rotation action.

In FIG. 4, in accordance with the rotation of the gear GE0 driven by the driving motor MO, the cam lever CL moves toward +Y direction (left side in FIG. 4). In accordance with the movement of the cam lever CL, the rotation center shaft CA is guided along the slope part of the center-shaft up-down cam HC that is formed on the cam lever CL, and is shifted upward (+Z direction) along the center-shaft guide groove CG. Sample positional relations between the members at the time on the rotation mechanism 21 are shown in FIG. 6. In FIG. 6, the rotation center shaft CA has shifted upward (+Z direction) from the state shown in FIG. 4 by one fourth of the differential between the long-side length and the short-side length of the display 1. The distance between the rotation center shaft CA and the complementary shaft DA is kept constant. In this situation, the display 1 has rotated 45° around an axis along the X-axis direction. In accordance with the movement of the cam lever CL, the vertical-position-detection switch VS is released from being pushed by the cam lever CL. The controller 27 detects that the display 1 is in the middle of rotating, and continues the rotation of the driving motor MO.

When the cam lever CL moves further toward the +Y direction (left side in FIG. 6) due to driving of the driving motor MO, the rotation center shaft CA reaches the location upward from the state shown in FIG. 4 by half of the differential between the long-side length and the short-side length of the display 1. This sets the display 1 in the horizontally-long position, that is, the position substantially perpendicular to the vertically-long position, and sets the upper-side location of the display 1 after the rotation to substantially coincide with the location before the rotation (FIG. 7). In this situation, the horizontal-position-detection switch HS is pushed down by the cam lever CL, and the controller 27 detects that the display 1 is set in the horizontally-long position, and stops the rotation of the driving motor MO.

As above, as the cam lever CL having the center-shaft up-down cam HV moves horizontally (Y-axis direction) by the driving of the driving part 21a, each of the rotation center shaft CA and the complementary shaft DA moves by the predetermined distance while keeping the distance between them constant, which rotates the display 1. That is, while keeping the distance constant to the rotation center shaft CA, the complementary shaft DA is guided to slide horizontally (Y-axis direction). At the same time, the rotation center shaft CA slides from the bottom (–Z direction) to the top (+Z direction) in the center-shaft guide groove CG This changes the positional relation between the complementary shaft DA and the rotation center shaft CA (the rotation center shaft CA slides to upper side of the complementary shaft DA), and rotates the display 1 around the two shafts DA and CA. As a result, the display 1 is rotated from the vertically-long position to the horizontally-long position. Moreover, the rotation center shaft CA slides upward (+Z direction) by half of the differential between the long-side length and the short-side length of the display 1. This sets the upper-side location of the display 1 after the rotation to substantially coincide with the location before the rotation (more details later). Moreover, the rotation center shaft CA that is set at the crossing point of two diagonal lines of the display 1 slides only in the vertical direction, which keeps the horizontal center of the display 1 substantially on the same vertical line before and after the rotation.

The example of the display 1 rotating from the vertically-long position to the horizontally-long position has been described. An example of the rotation from the horizontally-long position to the vertically-long position can be described in the reverse order. That is, the controller 27 rotates the driving motor MO in the reverse direction from the example described above to move the cam lever CL toward –Y direction (right side in the figures). This slides the rotation center shaft CA downward, and moves each of the components of the display 1 and the rotation mechanism 21 as shown in the order from FIG. 7, then FIG. 6 and to FIG. 4, which rotates the display 1 from the horizontally-long position to the vertically-long position.

Moreover, it is desirable to vary the rotation torque of the driving motor MO between the two cases; the case of the display 1 rotating from the vertically-long position to the horizontally-long position, and the case of the display 1 rotating from the horizontally-long position to the vertically-long position. In the case where the display 1 is rotated from the vertically-long position to the horizontally-long position while setting the upper-side position of the display 1 after the rotation to substantially coincide with the position before the rotation, as described above, the display 1 needs to be shifted upward (–Z direction) by the predetermined distance. Shifting the display 1 upward reduces the driving force of the driving motor MO due to the self-weight of the display 1. The reduced driving force of the driving motor MO causes to slow down the rotation speed of the display 1 rotating from the vertically-long position to the horizontally-long position, compared to the rotation speed of the display 1 rotating from the horizontally-long, position to the vertically-long position. Thus, it is recommended to provide predetermined-amount-higher torque to the driving motor MO at the time of rotating the display 1 from the vertically-long position to the horizontally-long position, compared to the case from the horizontally-long position to the vertically-long position. Controlling torque can be done by controlling the voltage value applied to the driving motor MO. The amount of torque to be increased is determined based on the performance of the driving motor MO and the weight of the display 1. This allows the display 1 to rotate substantially at the same speed regardless of the rotation directions of the display 1. By enabling the substantially-same speed for the both cases, the user can rotates the display 1 without incongruity.

Next, described are the sliding distance of the rotation center shaft CA and the distance between the rotation center shaft CA and the complementary shaft DA on the rotation mechanism 21. The sliding of the rotation center shaft CA and the complementary shaft DA rotates the display 1. Both of setting appropriately and sliding the rotation center shaft CA and the complementary shaft DA by appropriate distances rotate the display 1 approx. 90 degrees, and set the vertical position of the upper-side location and the horizontal center of the display 1 after the rotation to substantially coincide with the vertical position of the upper-side location and the horizontal center before the rotation. For convenience sake, the description hereafter uses L1 that indicates the length of the long side of the display 1 and L2 that indicates the length of the short side. In the composition hereafter, the distance between the rotation center shaft CA and the complementary shaft DA is kept constant. Moreover, the angle formed by the two straight lines; one is between the complementary shaft DA and the rotation center shaft CA set at the top location, and the other is between the complementary shaft DA and the rotation center shaft CA set at the bottom location, is 90°. Therefore, the three points; the complementary shaft DA, the top location and the bottom location of the rotation center shaft CA, form an isosceles right triangle having its base line between the top location and the bottom location of the rotation center shaft CA.

Figure 8:
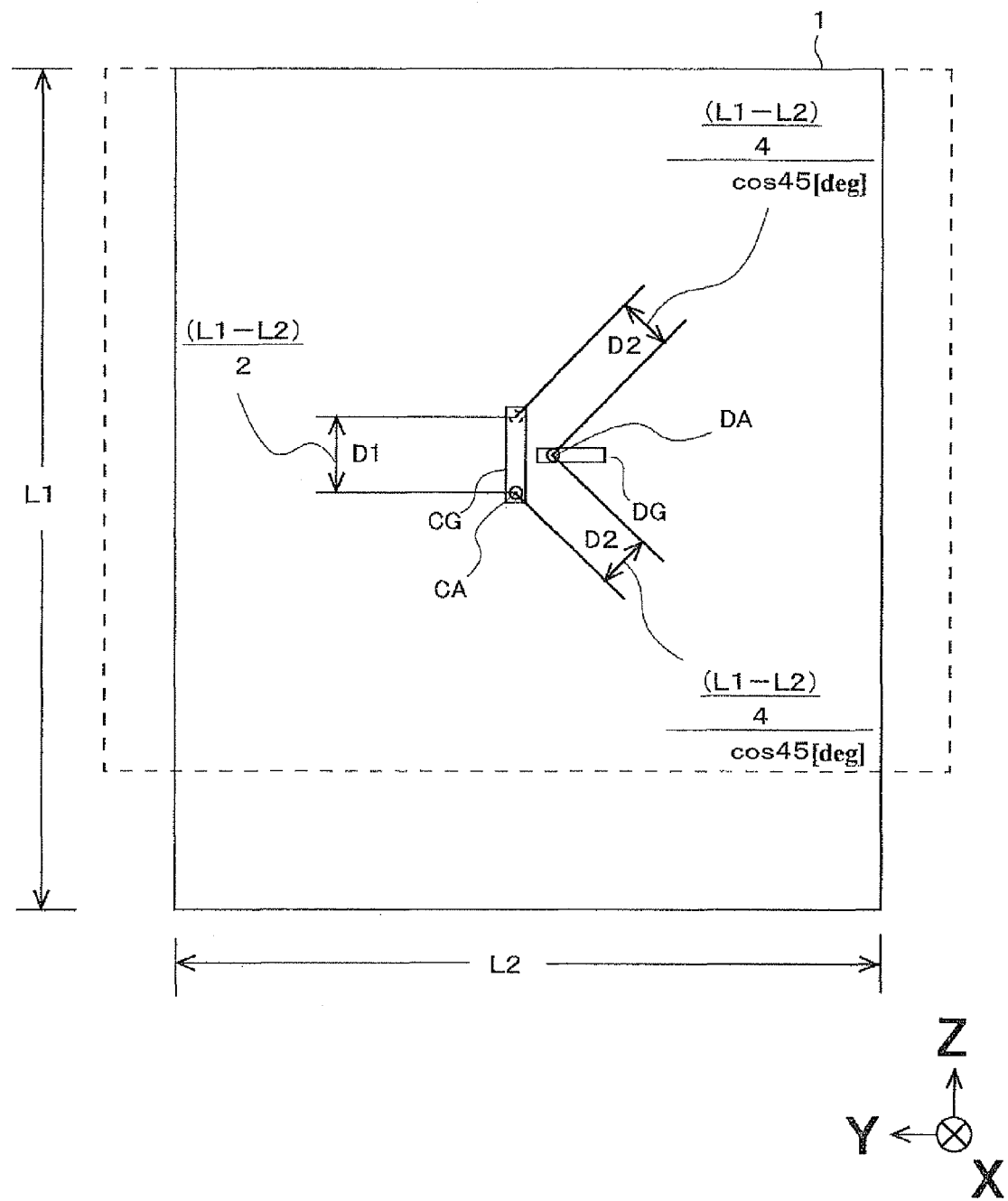
FIG. 8 shows another rear view of the display and the rotation mechanism set in the vertically-long position.

FIG. 8 shows the rear view of the display 1 in the vertically-long position, seen from the forward side of the vehicle. The figure indicated with dashed lines shows the rear view of the display 1 in the horizontally-long position, seen from the forward of the vehicle.

First, described is a distance D1 where the rotation center shaft CA slides. The rotation center shaft CA is located at the center of the diagonal lines of the display 1. Moreover, the rotation center shaft CA of the display 1 set in the vertically-long position is located at the bottom (edge of –Z direction) of the center-shaft guide groove CG. The rotation center shaft CA of the display 1 set in the horizontally-long position is located at the top (edge of +Z direction) of the center-shaft guide groove CG. That is, the rotation center shaft CA slides vertically between the bottom and the top of the center-shaft guide groove CG in accordance with the rotation of the display 1 from the vertically-long position to the horizontally-long position, or from the horizontally-long position to the vertically-long position. The distance D1 where the rotation center shaft CA slides is obtained based on the following formula (1).

$$D1 = (L1 - L2)/2 \qquad (1)$$

Setting the value obtained based on the formula (1) as the distance where the rotation center shaft CA slides in the center-shaft guide groove CG causes the vertical position of the upper-side location of the display 1 after the rotation to substantially coincide with the vertical position before the rotation. Therefore, the length of the center-shaft guide groove CG is determined in conformity with the distance D1.

Next, described is a distance D2 between the rotation center shaft CA and the complementary shaft DA. The display 1 is rotated by sliding the rotation center shaft CA and the complementary shaft DA that slides in the complementary-shaft guide groove DG. The distance between the complementary shaft DA and the rotation center shaft CA is kept constant during the rotation of the display 1. The distance D2 between the rotation center shaft CA and the complementary shaft DA is obtained based on the following formula (2).

$$D2 = ((L1 - L2)/4)/\cos 45° \qquad (2)$$

The value obtained based on the formula (2) is set as the distance between the rotation center shaft CA and the complementary shaft DA. Then, sliding the rotation center shaft CA in the center-shaft guide groove CG by the distance D1 obtained based on the formula (1) causes the display 1 to rotate approx. 90 degrees.

As described above, setting the values obtained based on the formulas (1) and (2) respectively as the distance DI where the rotation center shaft CA slides and as the distance D2 between the rotation center shaft CA and the complementary shaft DA causes the display 1 to rotate approx. 90 degrees, and sets the vertical position of the upper-side location and the horizontal center of the display 1 after the rotation to substantially coincide with the vertical position of the upper-side location and the horizontal line before the rotation.

<1-5. Projection Mechanism>

Next, described is the action by the projection mechanism 23 to project the display 1 toward user's seat side (a user side) seen from the center console, that is, the rear side (+X direction) of the vehicle. After the projection mechanism 23 has projected the display 1 by at least the predetermined distance, the rotation mechanism 21 can rotate the display 1 without making any contact with other objects in the periphery.

Figure 9:
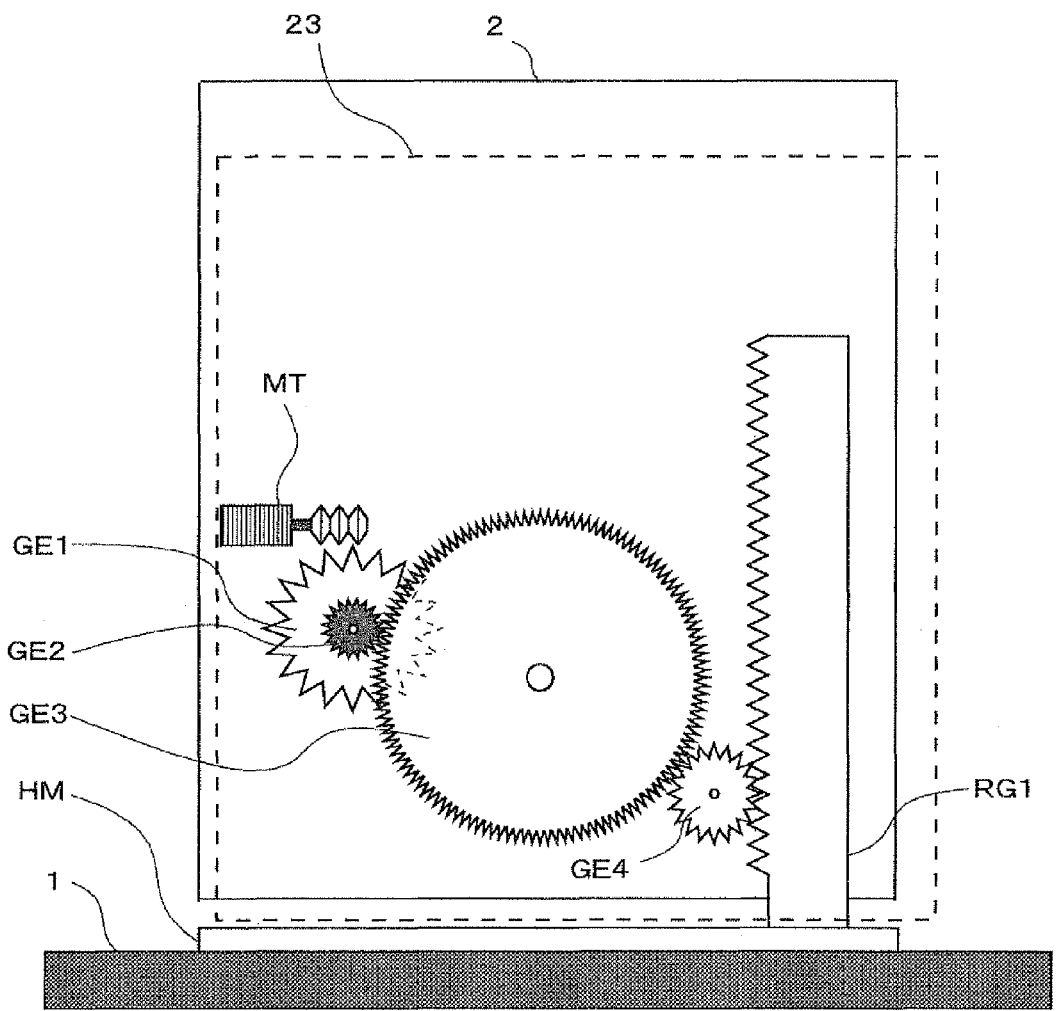
FIG. 9 shows a top view of a projection mechanism.

FIG. 9 shows a top view of the projection mechanism 23 seen from +Z direction (from above). The projection mechanism 23 includes a motor MT, a gear GE1, a gear GE2, a gear GE3, a gear GE4 and a rack gear lever RG1, and is disposed inside the main body 2.

The motor MT is an electric motor that includes a motor shaft set along the Y-axis direction, and is connected to a power supply not shown in FIG. 9. A worm gear that meshes with the gear GE1 is fixed to the motor shaft. The motor MT is controlled by the controller 27 in terms of its driving action.

The gear GE1 meshes with the worm gear of the motor MT and includes the shaft shared with the gear GE2. The gear GE2 meshes with the gear GE3 and includes the shaft shared with the gear GE1. The gear GE1 and the gear GE2 are thrust by a spring and connected each other in the tightness level where the power from the motor MT can be transmitted. The gear GE3 meshes with the gear GE2 and the gear GE4. The gear GE4 meshes with the gear GE3 and the rack gear lever RG1.

The rack gear lever RG1 that meshes with the gear GE4 and connects to the holding. member HM that holds the display 1 moves in the X-axis direction by the rotation of the gear GE4.

On the projection mechanism 23 having the composition as above, the motor shaft is rotated around its shaft line from the state where the display 1 is not projected, that is, where the display 1 is set close to the on-vehicle apparatus 3. The generated rotation driving force is transmitted sequentially to the worm gear, the gear GE1, the gear GE2, the gear GE3 and the gear GE4, and then the rack gear lever RG1 moves in the backward direction of the vehicle. In response to the movement of the rack gear lever RG1, the display 1 moves to user's side (+X direction), that is, the display 1 is projected.

The action for projecting display 1 on the projection mechanism 23 is started when the controller 27 starts rotation of the motor shaft of the motor MT, and completed when the controller 27 stops rotation of the motor shaft of the motor MT.

The controller 27 starts the rotation of the motor shaft of the motor MT based on the signal transmitted from the operation SW 11, the proximity sensor 12 or the touch panel included in the display 1. That is, the user can project the display 1 by making operations on the operation SW 11. The controller 27 reads out the position data 28a from the memory 28, and stops the rotation of the motor shaft of the motor MT based on the read position data 28a. That is, the controller 27 is capable of setting the display 1 at the position projected by an appropriate distance by stopping the rotation of the motor shaft when the rotation period included in the position data 28a elapses.

The action to set the display 1 from the projected position back to the position close to the on-vehicle apparatus 3 is described in the reverse order from the order described above. That is, rotating the motor in the reverse direction from the direction described above moves the display 1 from the position projected toward the rear side of the vehicle.

<1-6. Tilt Mechanism>

Next, described is the action to change the tilt angle of the display 1.

Figure 10:
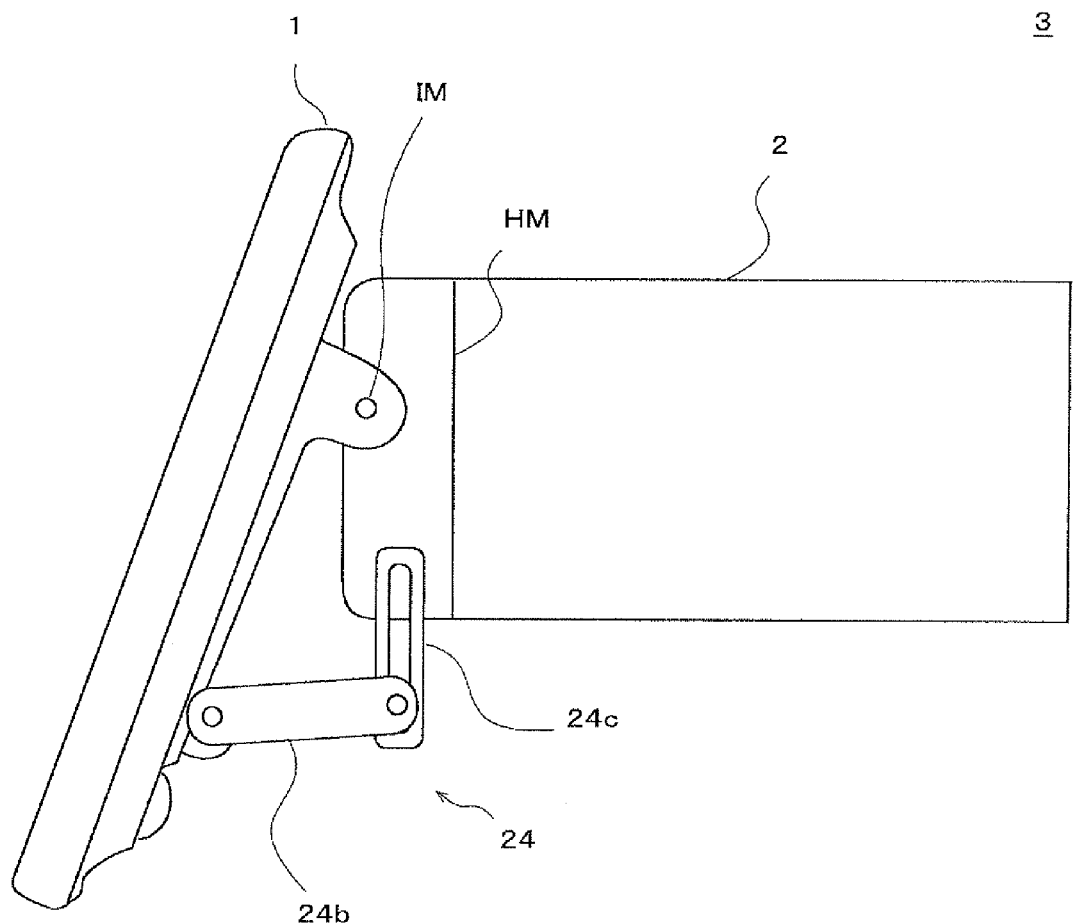
FIG. 10 shows a side view of a tilt mechanism.
Figure 11:
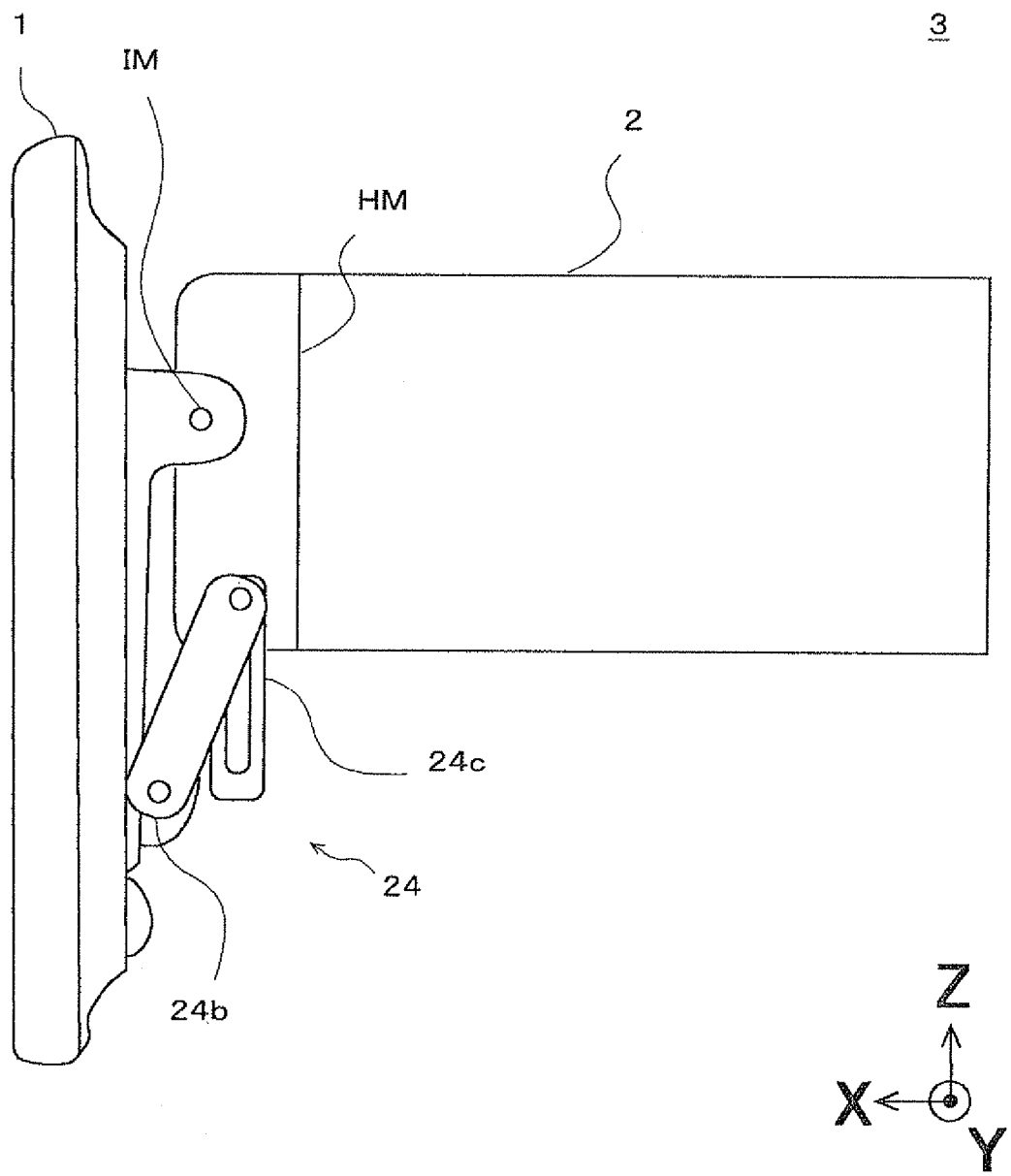
FIG. 11 shows another side view of the tilt mechanism.

Each of FIG. 10 and FIG. 11 shows the side view of the display 1, the main body 2, the tilt mechanism 4 and other devices seen from +Y direction (right side of the vehicle). In FIGS. 10 and 11, the display 1 is fixed to the holding member HM by use of the tilt mechanism 24 and a holding pin IM.

The tilt mechanism 24 rotates the display 1 vertically around the holding pin IM set along the Y-axis direction. That is, the tilt mechanism 24 is the mechanism that tilts. The tilt mechanism 24 includes a support bar 24b that supports the lower part of the display 1. One end of the support bar 24b is connected to the lower part of the display 1 in a rotatable condition. The other end of the support bar 24b is connected to a shaft coupled with a motor in the main body 2 (not shown in the figures), in a condition movable vertically along a slide rail 24c. Moving the other end of the support bar 24b along the slide rail 24c moves the lower part of the display 1 vertically around the holding pin IM, which causes the display 1 to be tilted. The other end of the support bar 24 is moved by the motor not shown in FIG. 10. The maximum tilt angle of the display 1 tilted around the holding pin IM by the tilt mechanism 24 is, for example, 20°.

The holding pin IM is a shaft for connecting the bracket of the display 1 to the holding member HM.

FIG. 10 shows the tilt mechanism 24 in the condition where the tilt angle of the display 1 is not changed (in a default state). As shown in FIG. 10, the display 1 is tilted to a vertical direction, having the front of the operation surface facing upward from a horizontal direction (X-axis direction). The tilt mechanism 24 starts changing the tilt angle of the display 1 from the default state.

The condition for changing the tilt angel of the display 1 by the tilt mechanism 24 is that the illuminance sensor 13 detects a certain level of illuminance. When the illuminance sensor 13 detects a certain level of illuminance, in some cases, it is hard for a user to view the screen (operation surface) of the display 1 due to light exposure. In this case, changing the tilt angle of the display 1 by the tilt mechanism 24 can reduce the light exposure on the screen. It is recommended that the tilt mechanism 24 cause the lower part of the display 1 to be rotated toward −X direction around a shaft line along the Y-axis direction so that the tilt angle of the display 1 becomes smaller (the display 1 becomes along a vertical line). The illuminance sensor 13 detects the certain level of illuminance of the sunlight mainly coming from a windshield. That is, rotating the lower part of the display 1 toward −X direction around the shaft line along the Y-axis direction prevents exposure to the user, of the sunlight that is thrown from above the display 1 through a windshield and reflects on the screen of the display 1.

FIG. 11 shows the tilt mechanism 24 in the condition where the tilt angle of the display 1 is changed. As shown in FIG. 11, the display 1 is set substantially along the vertical direction (Z-axis direction), having the front of the operation surface facing toward the substantially-horizontal direction (X-axis direction). The changed tilt angle is detected by the angle sensor 24a, and the angle data are entered in the controller 27.

The tilt mechanism 24 may change the tilt angle of the display 1 in response to user's operation on the operation SW 11 or the steering SW 4. In this case, the tilt angle for change may be set in response to the number of times or the period of the user's operation on the operation SW 11 or the steering SW 4. In an example, each time or for one second the user makes an operation on the operation SW 11 or the steering SW 4, the tilt angle is changed by 5°.

<1-7. Processing>

Next, described is the processing for rotating the display 1.

Figure 12:
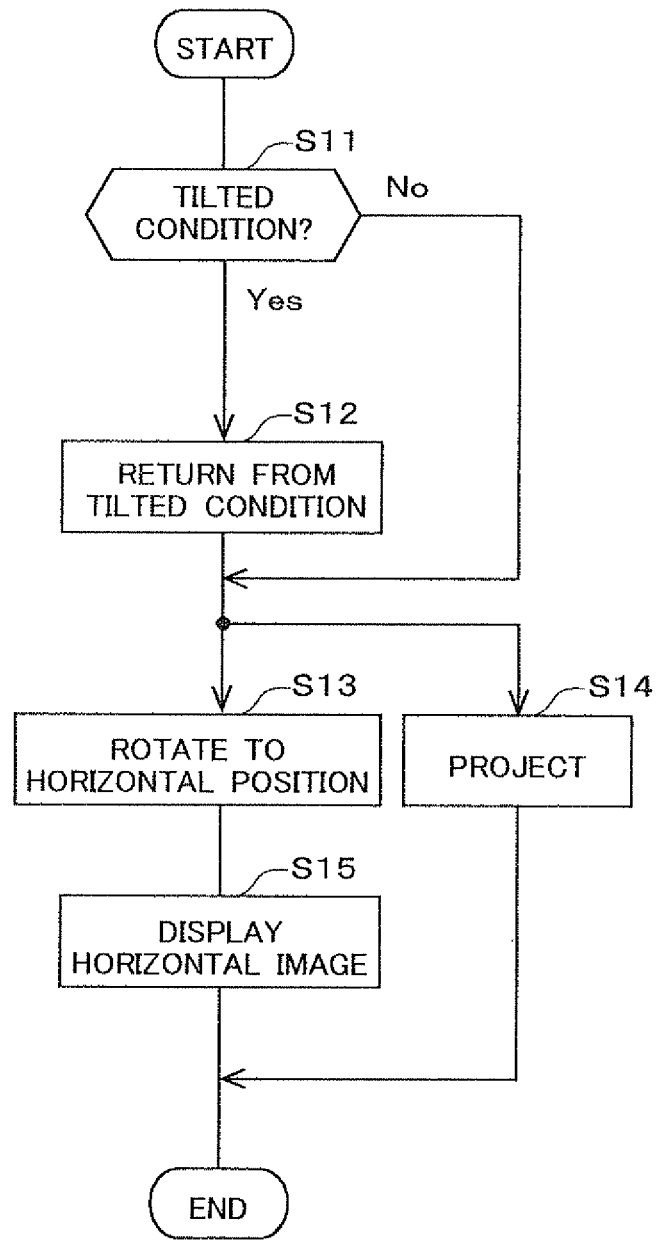
FIG. 12 is a flowchart showing the processing for rotating the display.
Figure 13:
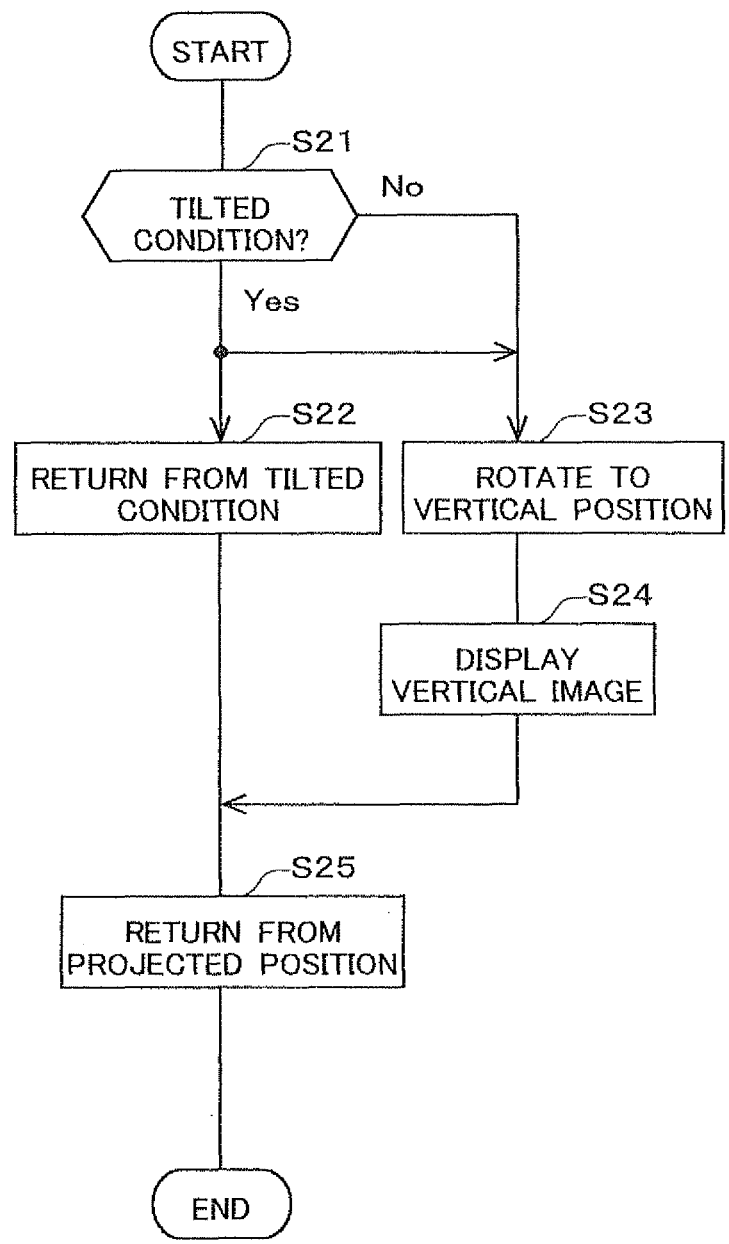
FIG. 13 is another flowchart showing the processing for rotating the display.

Each of FIG. 12 and FIG. 13 is the flowchart showing the processing for rotating the display 1. The flowchart in FIG. 12 shows the processing for setting the display 1 from a vertically-long and not-projected-into-vehicle-cabin position to a horizontally-long and projected-into-vehicle-cabin condition. The flowchart in FIG. 13 shows the processing for setting the display 1 from the horizontally-long and projected-into-vehicle-cabin condition to the vertically-long and not-projected-into-vehicle-cabin condition.

Each of the processing in FIG. 12 and FIG. 13 starts based on the signal transmitted from the operation SW 11, the steering SW 4, the proximity sensor 12 or the touch panel included in the display 1. That is, the user can start rotating the display 1 by touching the operation SW 11 or others.

First, the flowchart shown in FIG. 12 is described. Upon the start of the processing, the controller 27 judges whether the display 1 is tilted or not based on the angle data concerning the display 1 transmitted from the angle sensor 24a (step S11). Since rotating or projecting the display 1 changes the angle of the light radiated on the screen of the display 1, the rotated or projected display 1 does not require tilting any more. Therefore, the controller 27 makes a judgment at the step S11 to return the display 1 from the tilted state to the default state after the rotation or the projection of the display 1.

When judging that the display 1 is tilted (Yes at the step S11), the controller 27 controls the tilt mechanism 24 to return the display 1 from the tilted state to the default state (step S12).

After the step S12 or when the controller 27 judges that the display 1 is not tilted (No at the step S11), the processing goes to a step S13 or a step S14.

Since the rotation mechanism 21 and the projection mechanism 23 individually work, the step S13 and the step S14 are implemented simultaneously. That is, the display 1 is rotated by the rotation mechanism 21, and as well projected into the vehicle cabin by the projection mechanism 23. Since the rotation mechanism 21 and the projection mechanism 23 individually have a driving source, the rotation mechanism 21 and the projection mechanism 23 can individually work. Implementing the both steps simultaneously completes the set of the display 1 earlier than the case of implementing the steps one by one. Not only the step S13 and the step S14 but the step S12 may be implemented simultaneously. In this case, setting the display 1 can be completed even earlier. However, implementing the step S12 separately as in the flowchart of FIG. 12 prevents complicated multiple-concurrent processing and simplifies the processing.

At the step S13, the rotation mechanism 21 rotates the display 1 from the vertically-long position to the horizontally-long position, that is, rotates the display 1 approx. 90 degrees, and as well sets the vertical position of the upper side of the display 1 after the rotation to substantially coincide with the vertical position of the upper side before the rotation.

In this case, after the projection mechanism 23 has projected the display 1 by at least the predetermined distance at the step S14, the rotation mechanism 21 starts rotating the display 1. The display 1 close to the on-vehicle apparatus 3 normally fits inside the cover frame installed in the center console. Thus, if the rotation mechanism 21 starts rotating the display 1 without being projected, the display 1 possibly contacts the cover frame while rotating. Therefore, after the projection mechanism 23 has projected the display 1 up to the position where the display 1 gets out of the cover frame, the rotation mechanism 21 starts rotating the display 1, which prevents such a contact.

Upon completion of the rotation of the display 1, the controller 27 detects that the display 1 has rotated from the vertically-long position to the horizontally-long position, based on the signal transmitted from the position-detection mechanism 22.

At the step S14, the projection mechanism 23 projects the display 1 into the vehicle cabin. In this case, the controller 27 projects the display 1 to the position based on the position data 28a.

When the rotation mechanism 21 starts rotating the display 1 for the step S13, the controller 27 controls the display controller 25 to display on the display 1 the images applied for the horizontally-long position (step S15). The display controller 25, in response to the start of the rotation of the display 1, that is, concurrently at the start of the rotation or just after the start, changes display from the images applied for the vertically-long position to the images applied for the horizontally-long position, and displays the images applied for the horizontally-long position before the completion of the rotation. This allows the user to be aware of the change of the images concurrently at the start of the rotation of the display 1 or just after the start, and to view the images applied for the horizontally-long position just after the completion of the rotation.

Implementing all of the steps S13, S14 and S15 ends the whole processing for setting the display 1 from the vertically-long and not-projected-into-vehicle-cabin position back to the horizontally-long and projected-into-vehicle-cabin position.

Next, the flowchart shown in FIG. 13 is described. Upon the start of the processing, the controller 27 judges whether the display 1 is tilted or not based on the angle data concerning the display 1 transmitted from the angle sensor 24a (step S21). Since rotating or projecting the display 1 changes the angle of the light radiated on the screen of the display 1, the rotated or projected display 1 does not require tilting any more. Therefore, the controller 27 makes a judgment at the step S21 to return the display 1 from the tilted state to the default state after the rotation or the projection of the display 1.

When the controller 27 judges that the display 1 is tilted (Yes at the step S21), a step S22 and a step S23 are concurrently implemented. The tilt mechanism 24 and the rotation mechanism 21 concurrently work, which implements the step S22 and the step S23 concurrently. Since the rotation mechanism 21 and the projection mechanism 23 individually include a power source, they can work concurrently. Concurrently implementing the both steps completes the set of the display 1 earlier than the case of implementing the steps one by one.

The controller 27 controls the tilt mechanism 24 to return the display 1 from the tilted state to the default state at the step S22.

At the step S23, the rotation mechanism 21 rotates the display 1 from the horizontally-long position to the vertically-long position, that is, rotates the display 1 approx. 90 degrees, and as well sets the vertical position of the upper side of the display 1 after the rotation to substantially coincide with the vertical position of the upper side before the rotation. Then, the controller 27 detects that the display 1 has rotated from the horizontally-long position to the vertically-long position, based on the signal transmitted from the position-detection mechanism 22.

When the rotation mechanism 21 starts rotating the display 1 for the step S23, the controller 27 controls the display controller 25 to display on the display 1 the images applied for the vertically-long position (step S24). The display controller 25, in response to the start of the rotation of the display 1, that is, concurrently at the start of the rotation or just after the start, changes display from the images applied for the horizontally-long position to the images applied for the vertically-long position, and displays the images applied for the vertically-long position before the completion of the rotation. This allows the user to be aware of the change of the images concurrently at the start of the rotation of the display 1 or just after the start, and to view the images applied for the vertically-long position just after the completion of the rotation.

After the steps S22, S23 and S24, the processing goes to a step S25.

At the step S25, the projection mechanism 23 returns the projected display 1 back to the original position where the display 1 is close to the on-vehicle apparatus 3.

The step S25 for returning the projected display 1 back to the original position is implemented after the step S23 for rotating the display 1, that is, the display 1 is rotated before the display 1 is returned back to the original not-projected state. This prevents the display 1 from rotating at the position close to the on-vehicle apparatus 3. That is, the display 1 does not contact any object located near the on-vehicle apparatus 3 during rotating.

Implementing the step S25 completes the whole processing for setting the display 1 from the horizontally-long and projected-into-vehicle-cabin position to the vertically-long and not-projected-into-vehicle-cabin position.

As described so far, the on-vehicle apparatus 3 of the embodiment rotates the display 1 that has the long side and the short side and displays images, so that the vertical position of the upper side of the display 1 in the first position where the long side is located as an upper side substantially coincides with the vertical position of the upper side in the second position where the short side is located as the upper side. This sets the display 1 at an easily visible position for the user with less eye movement.

<2. Modification>

The invention is not to be considered limited to the described embodiment above, but includes various modifications. Hereafter, some modifications are described. Every embodiment described above and below can be arbitrarily combined with others.

In the embodiment described above, the display 1 that is not projected into the vehicle cabin is set in the vertically-long position, and the display 1 that is projected into the vehicle cabin is set in the horizontally-long position. However, the display 1 that is not projected into the vehicle cabin may be set in the horizontally-long position, and the display 1 that is projected into the vehicle cabin may be set in the vertically-long position. The display 1 may be set in either position; the horizontally-long position or the vertically-long position, regardless of before and after the projection.

In the embodiments described above, a part or the whole of the processing that is implemented by CPU processing based on programs may be implemented by electrical hardware circuits.

While the invention has been shown and described in detail, the foregoing description is in all aspects illustrative and not restrictive. It is therefore understood that numerous other modifications and variations can be devised without departing from the scope of the invention.

What is claimed is:

1. An on-vehicle apparatus that is installed on a vehicle, the on-vehicle apparatus comprising:
   a display that includes a long side and a short side and displays an image; and
   a rotation mechanism that rotates the display between a first position where the long side becomes an upper side and a second position where the short side becomes the upper side, wherein:
   the rotation mechanism rotates the display so that the upper side of the display in the first position substantially coincides with the upper side of the display in the second position,
   the display further includes:
      a center shaft that works as a center of rotation when the rotation mechanism rotates the display; and
      a complementary shaft that is separated from the center shaft by a predetermined distance, wherein;
   the rotation mechanism slides the center shaft in a vertical direction to rotate the display, and
   the complementary shaft is guided to a direction substantially perpendicular to the vertical direction in which the center shaft slides.

2. The on-vehicle apparatus of claim 1, wherein
the rotation mechanism causes a horizontal center of the display in the first position to substantially coincide with a horizontal center of the display in the second position.

3. The on-vehicle apparatus of claim 2, wherein
the display includes a center shaft substantially at a middle of both of the long side and the short side of the display, the center shaft working as a center of rotation performed by the rotation mechanism, and
the rotation mechanism slides the center shaft in a vertical direction.

4. The on-vehicle apparatus of claim 1, wherein
when a length of the long side of the display is defined as L1 and a length of the short side of the display is defined as L2, a sliding distance of the center shaft is (L1-L2)/2 and,
a distance between the center shaft and the complementary shaft is ((L1-L2)/4)/cos 45°.

5. The on-vehicle apparatus of claim 1, further comprising:
a movable member that includes a cutout formed at an edge part thereof and that moves to a predetermined location when the display is set in the first position; and
a fixed shaft that is fixed to the display, wherein
the fixed shaft and the cutout of the movable member are fitted to each other when the display is set in the first position.

6. The on-vehicle apparatus of claim 5, further comprising:
a detection mechanism that detects a contact with the movable member, wherein
the detection mechanism comes into contact with the movable member when the display is set in the first position.

7. The on-vehicle apparatus of claim 1, wherein
the rotation mechanism varies torque between a case of rotating the display from the first position to the second position and another case of rotating the display from the second position to the first position.

8. The on-vehicle apparatus of claim 1, further comprising:
a projection mechanism that projects the display into a vehicle cabin of the vehicle, wherein
the rotation mechanism rotates the display after the display is projected by a predetermined distance or longer.

9. The on-vehicle apparatus of claim 8, wherein
the rotation mechanism and the projection mechanism move the display in parallel.

10. The on-vehicle apparatus of claim 1, further comprising:
a proximity sensor that detects an object approaching the display, wherein
the rotation mechanism rotates the display when the proximity sensor detects the object approaching.

11. The on-vehicle apparatus of claim 1, further comprising:
a display controller that causes the display to display an image, wherein
the display controller causes the display to display the image corresponding to the position of the display.

12. The on-vehicle apparatus of claim 11, wherein
in response to the rotation mechanism starting rotating the display, the display controller causes the display to display the image corresponding to the position after completion of rotating the display.

13. A rotation method for rotating a display of an on-vehicle apparatus that is installed on a vehicle, the rotation method comprising the steps of:
detecting an object approaching the display that has a long side and a short side;
sliding a center shaft, which works as a center of rotation when a rotation mechanism rotates the display, in a vertical direction to rotate the display, and
guiding a complementary shaft, which is separated from the center shaft by a predetermining distance, to a direction substantially perpendicular to the vertical direction in which the center shaft slides; and
in response to detection of the object approaching, rotating the display from a first position where the long side becomes as an upper side to a second position where the short side becomes as the upper side, and causing the upper side of the display in the first position to substantially coincide with the upper side of the display in the second position.

* * * * *